Aug. 28, 1928.
M. MASON
1,682,706
DETERMINATION OF WAVE ENERGY DIRECTION
Filed June 25, 1919     12 Sheets-Sheet 1
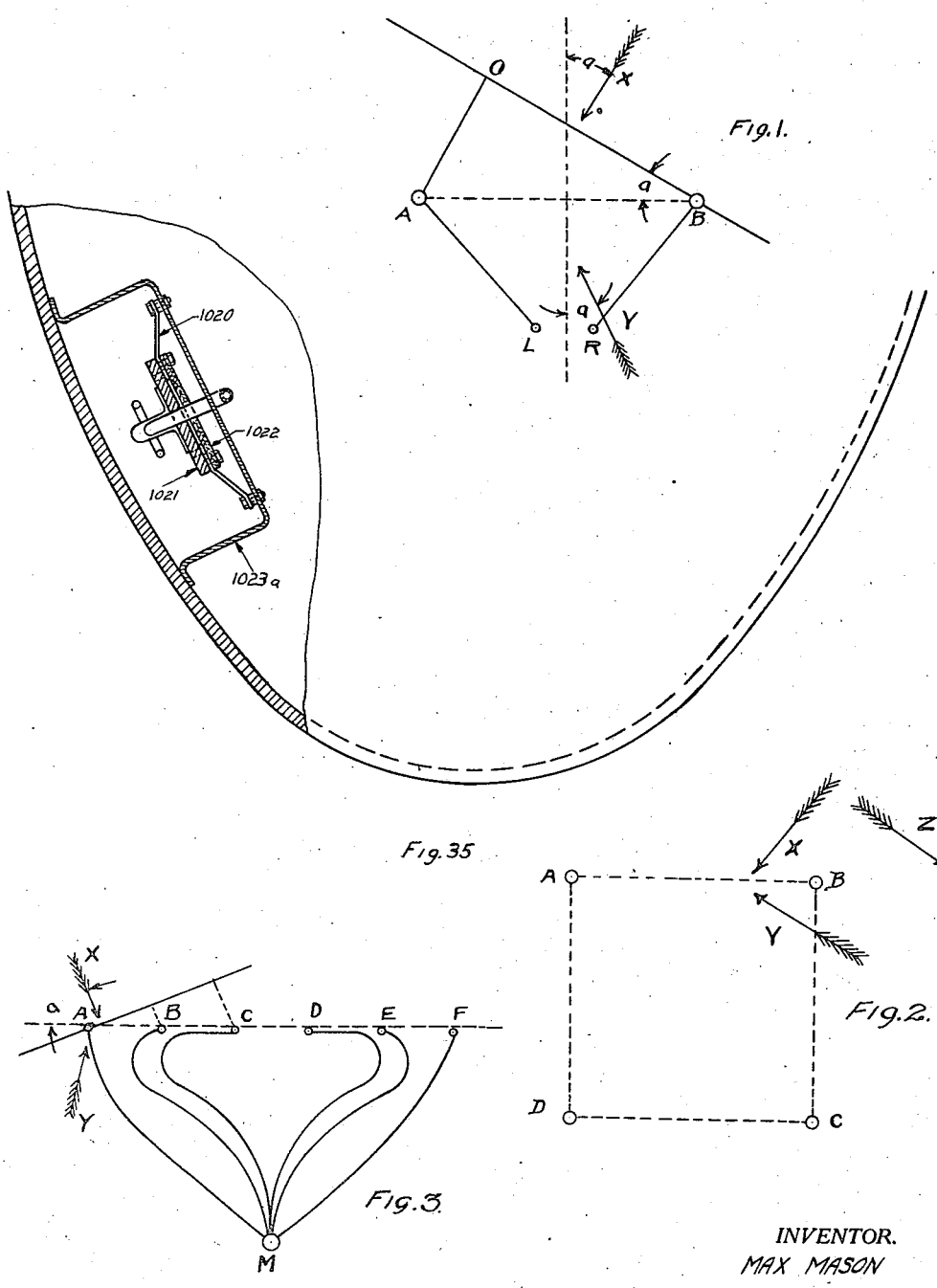
INVENTOR.
MAX MASON
BY
ATTORNEY.

Aug. 28, 1928.
M. MASON
1,682,706
DETERMINATION OF WAVE ENERGY DIRECTION
Filed June 25, 1919 12 Sheets-Sheet 2
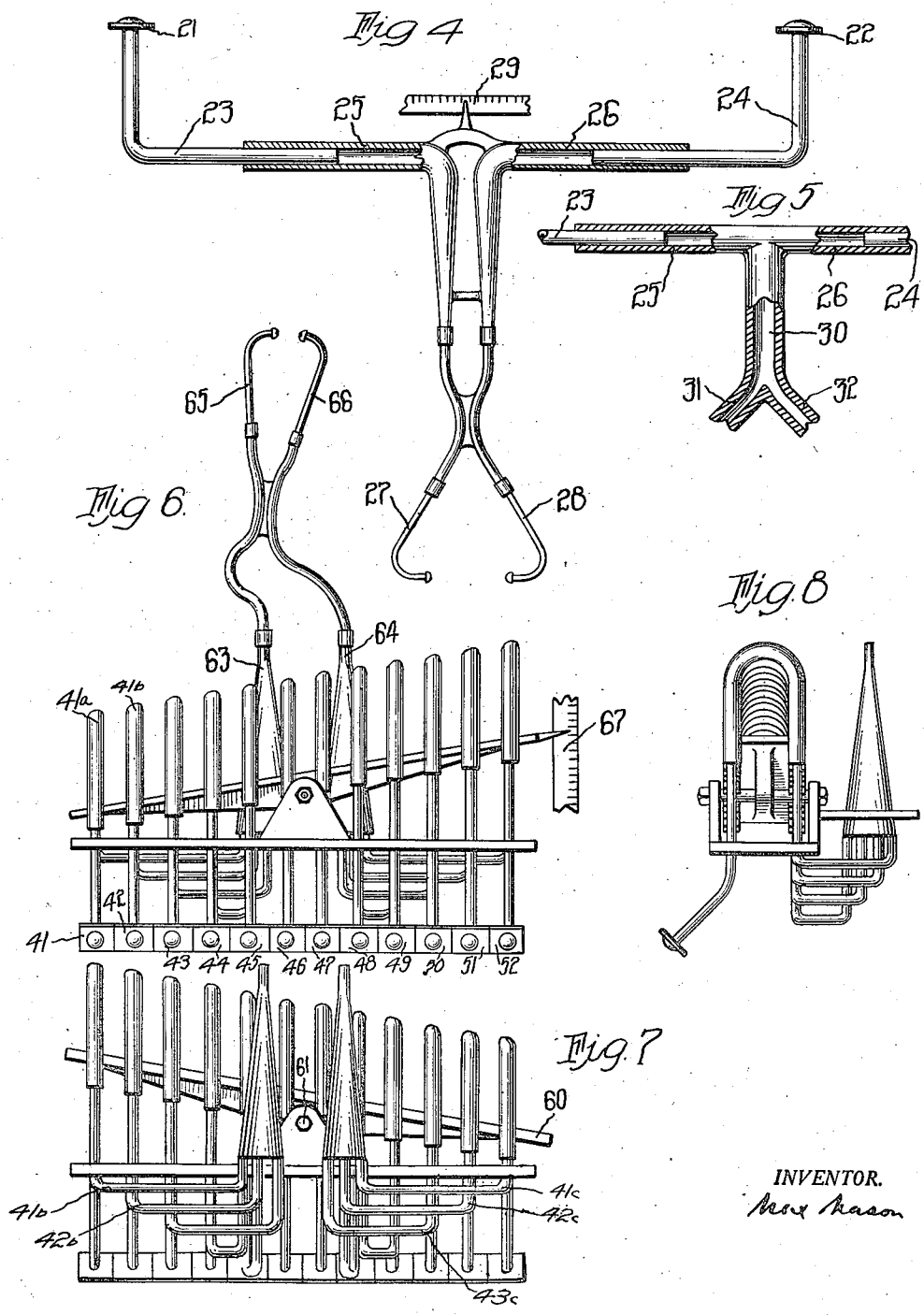
INVENTOR.
Max Mason INVENTOR.
Max Mason Aug. 28, 1928.
M. MASON
1,682,706
DETERMINATION OF WAVE ENERGY DIRECTION
Filed June 25, 1919     12 Sheets-Sheet 4
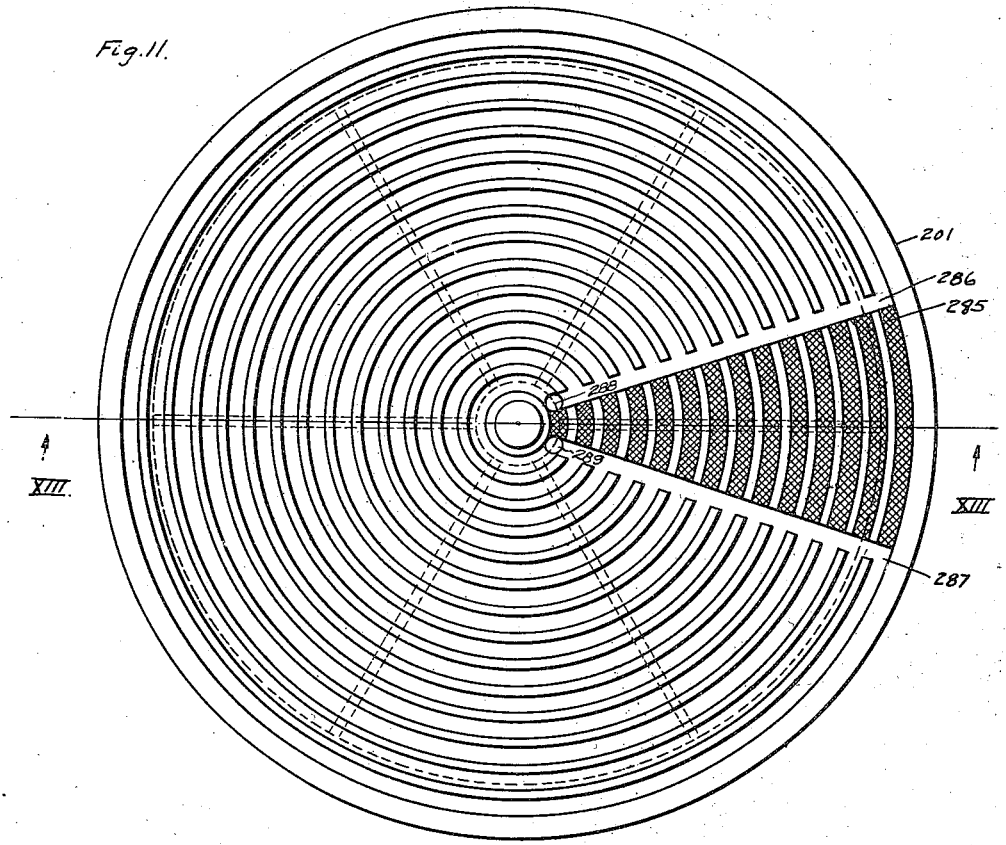
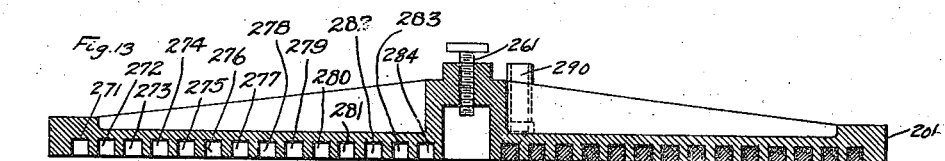
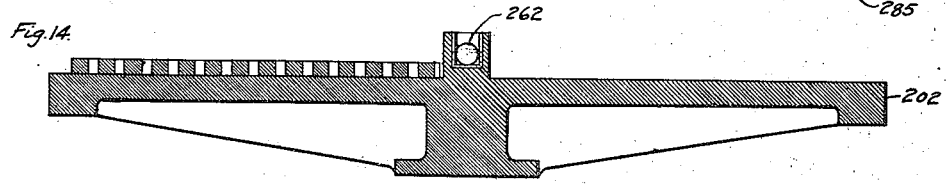
INVENTOR.

Aug. 28, 1928.
M. MASON
1,682,706
DETERMINATION OF WAVE ENERGY DIRECTION
Filed June 25, 1919    12 Sheets-Sheet 5
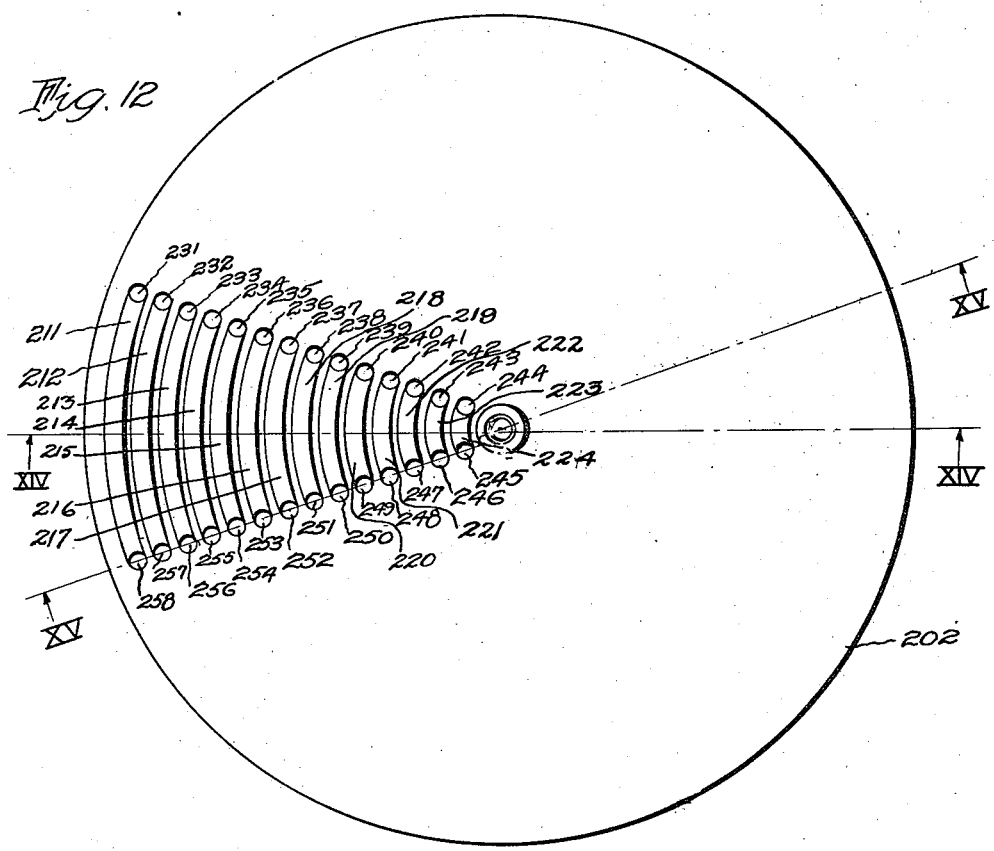
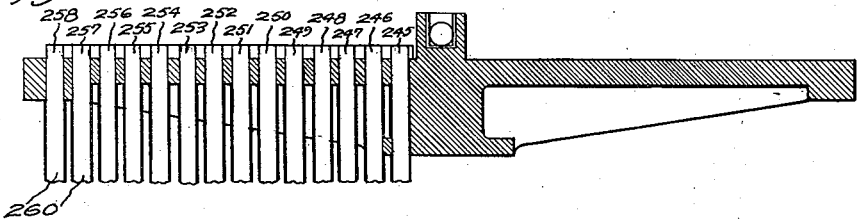
INVENTOR.
Max Mason

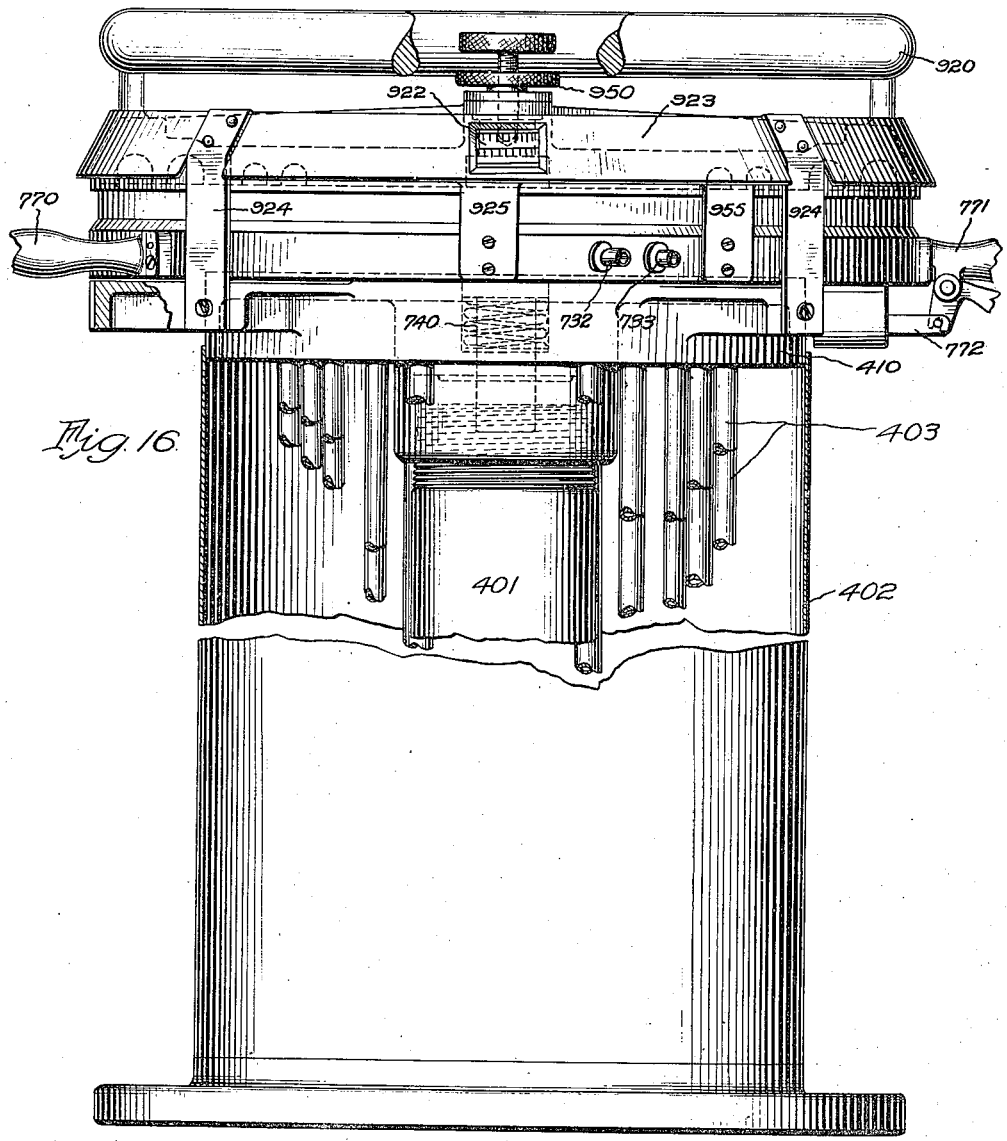

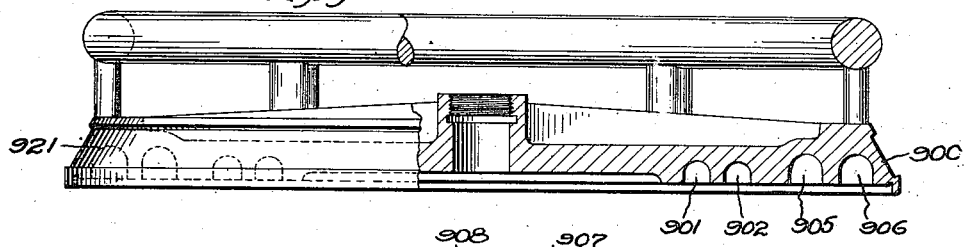
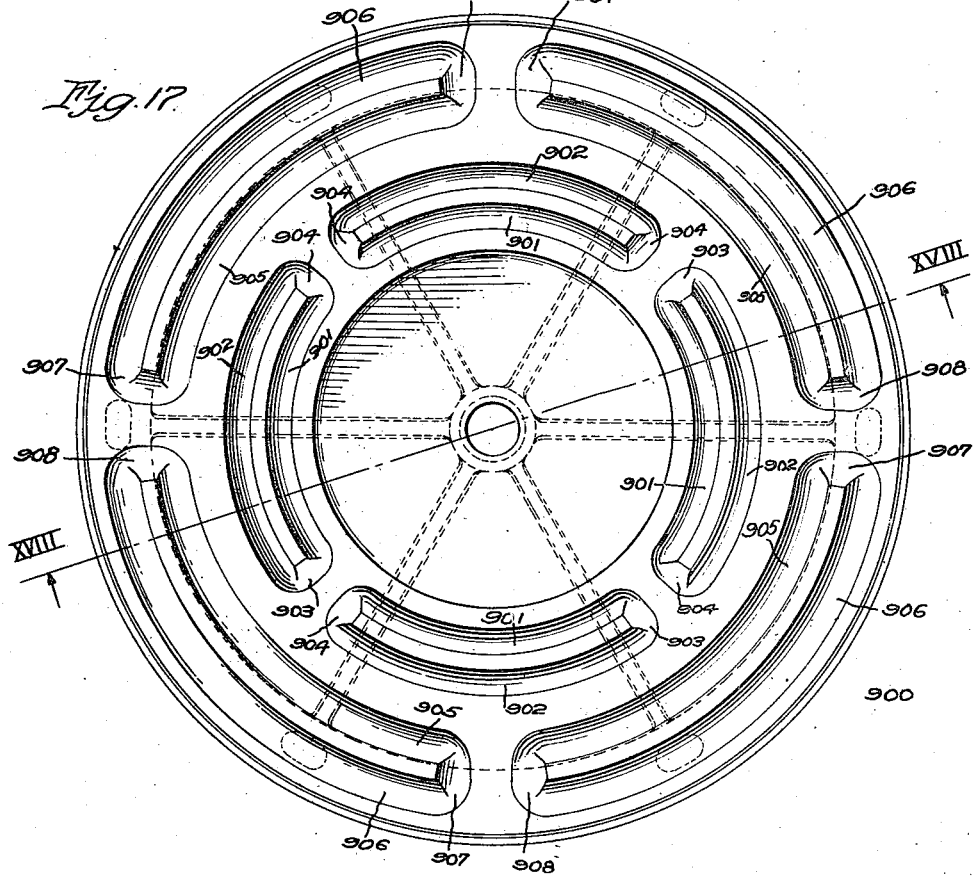

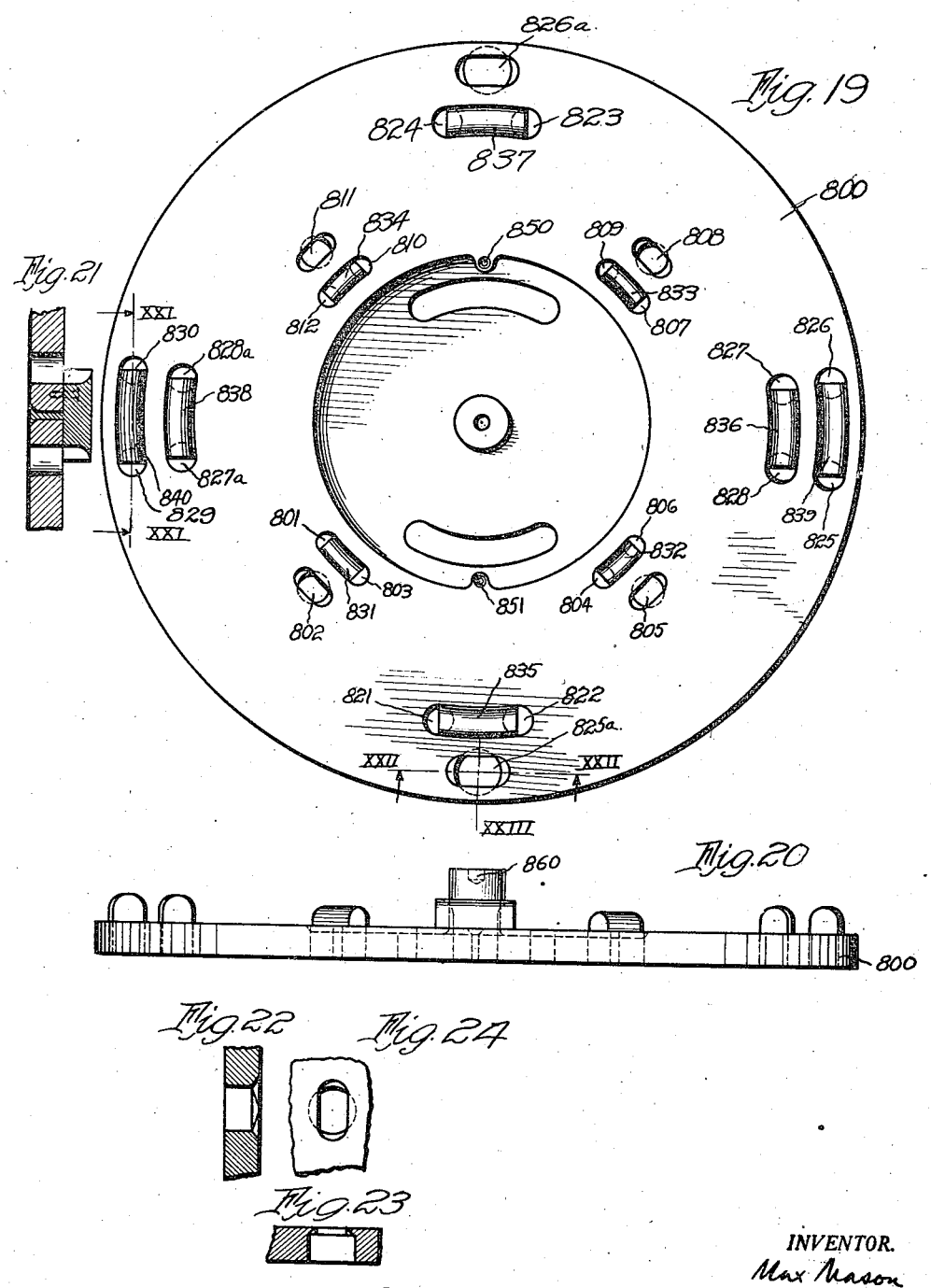

Aug. 28, 1928.

M. MASON 1,682,706

DETERMINATION OF WAVE ENERGY DIRECTION

Filed June 25, 1919     12 Sheets-Sheet 9

INVENTOR.
Max Mason

INVENTOR.
Max Mason

Aug. 28, 1928.
M. MASON
1,682,706
DETERMINATION OF WAVE ENERGY DIRECTION
Filed June 25, 1919   12 Sheets-Sheet 11
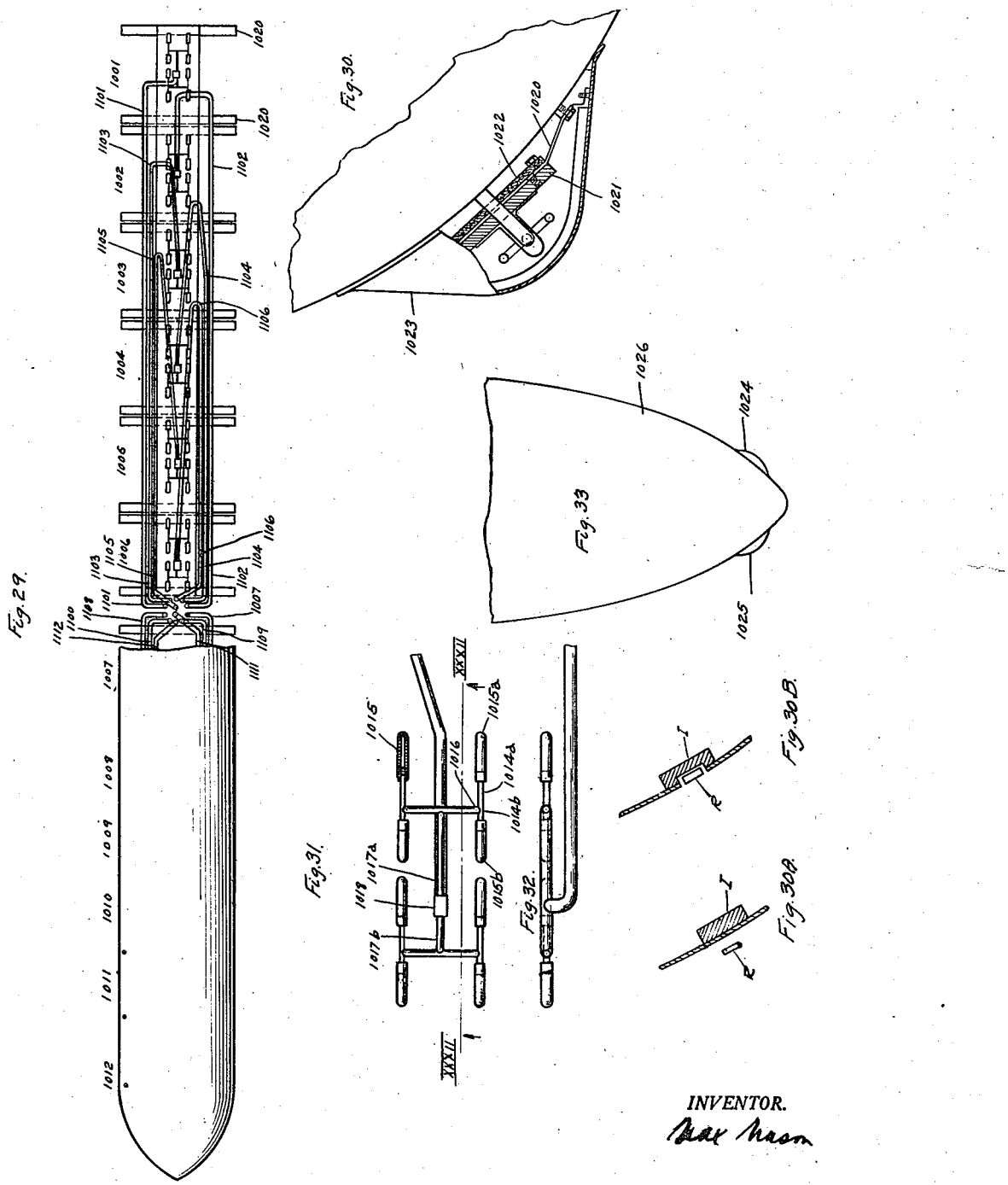
INVENTOR.
Max Mason Patented Aug. 28, 1928.

1,682,706

UNITED STATES PATENT OFFICE.

MAX MASON, OF NEW LONDON, CONNECTICUT, ASSIGNOR TO SUBMARINE SIGNAL COMPANY, OF PORTLAND, MAINE, A CORPORATION OF MAINE.

DETERMINATION OF WAVE-ENERGY DIRECTION.

Application filed June 25, 1919. Serial No. 306,681½.

The present invention relates to the determination of the direction of wave energy and more particularly to the determination of such direction by means of two or more receivers of wave energy with compensated connections from such receivers. The present invention is illustrated and explained with particular reference to apparatus for determining the direction of sound waves traveling in water, but it is to be understood that the present invention is not limited to apparatus employed for such purpose but is applicable to the determination of the direction of other forms of wave energy, such for example as the radiant energy employed for wireless telegraphy.

Figure 9:
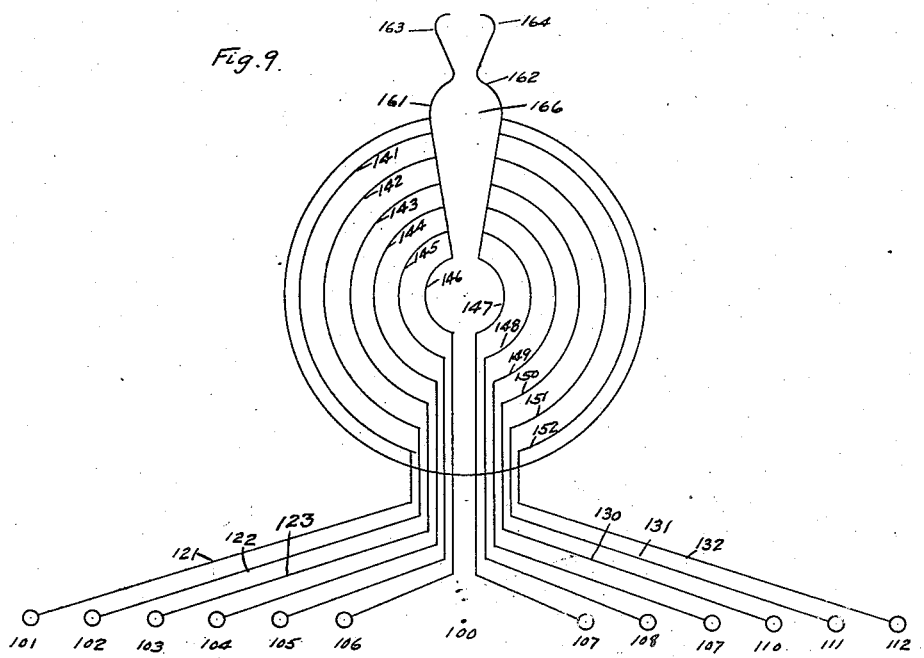
Figure 10:
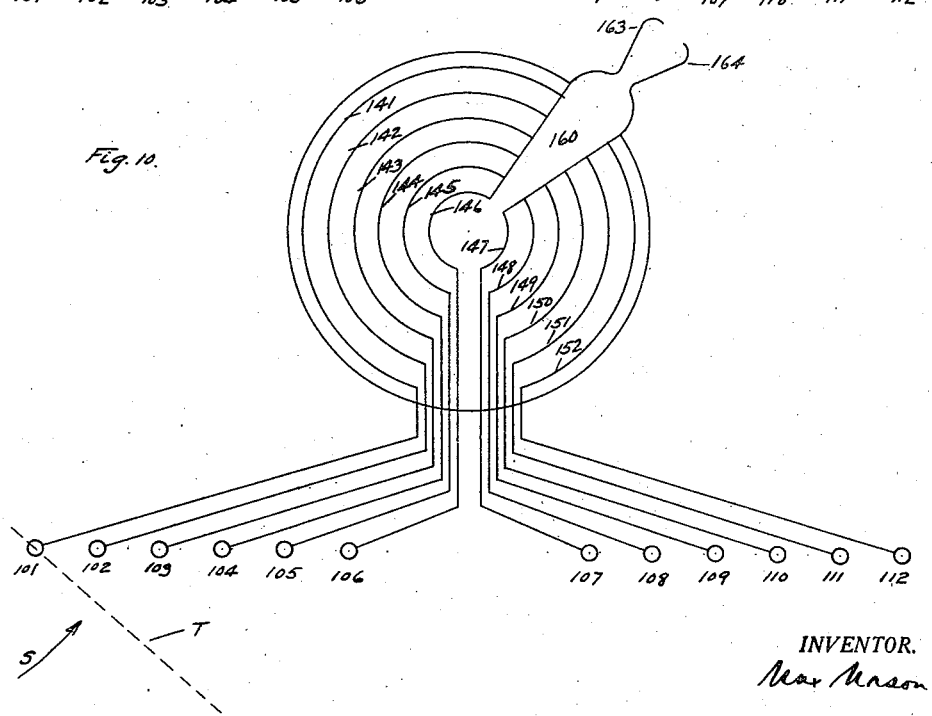
Figure 25:
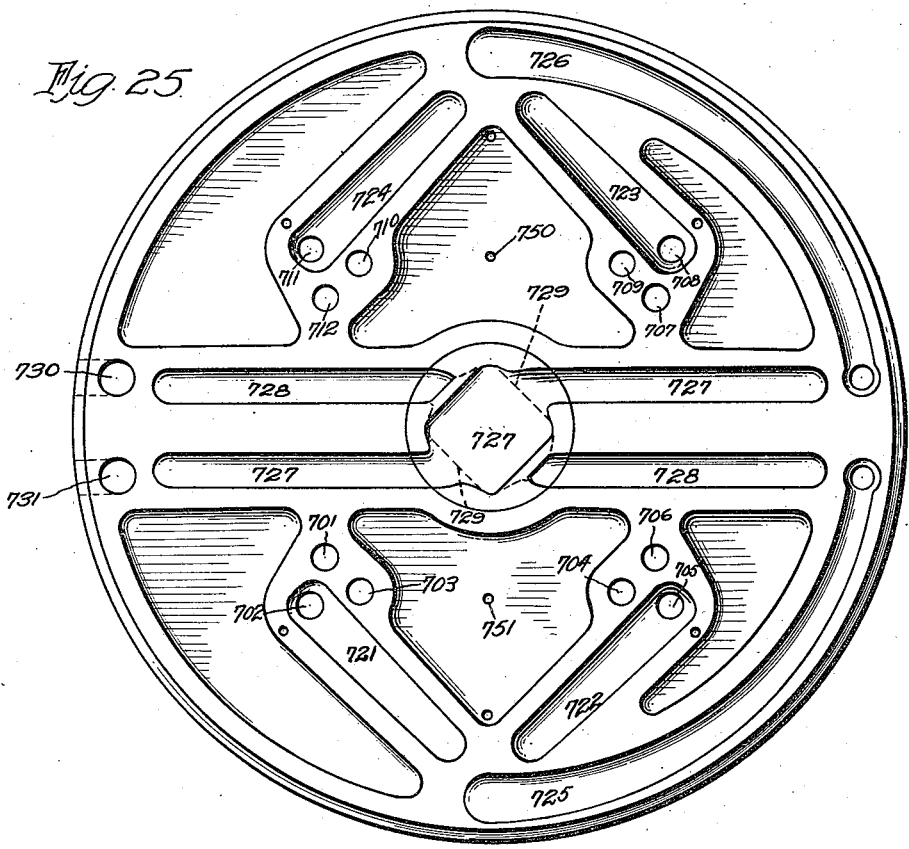
Figure 26:
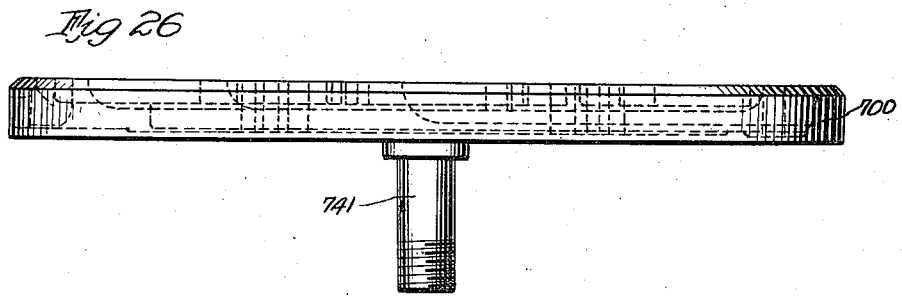
Figure 27:
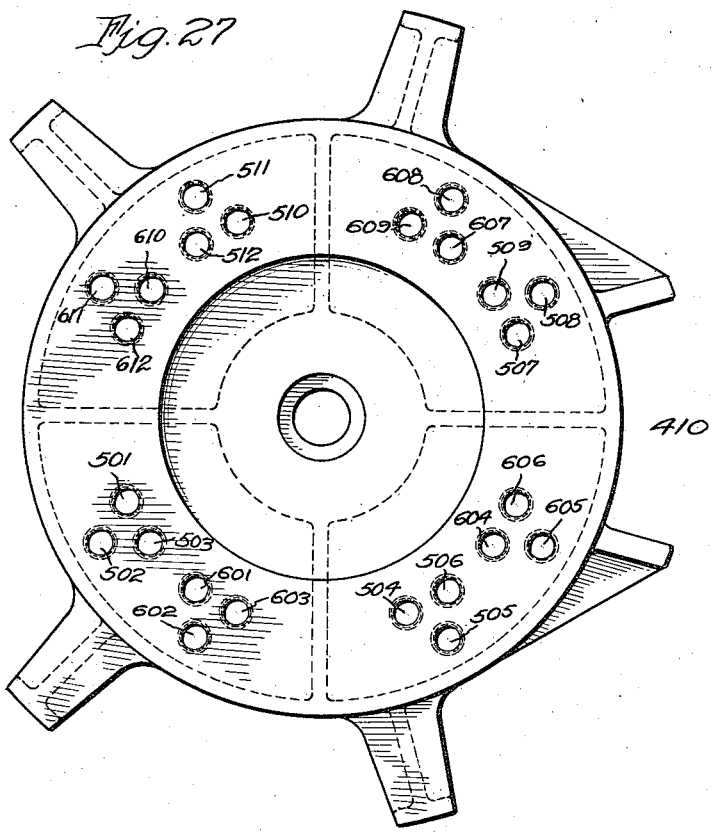
Figure 28:
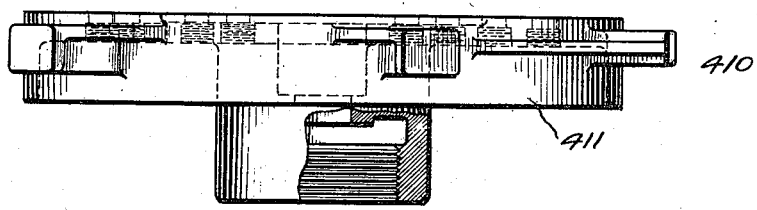
Figure 34:
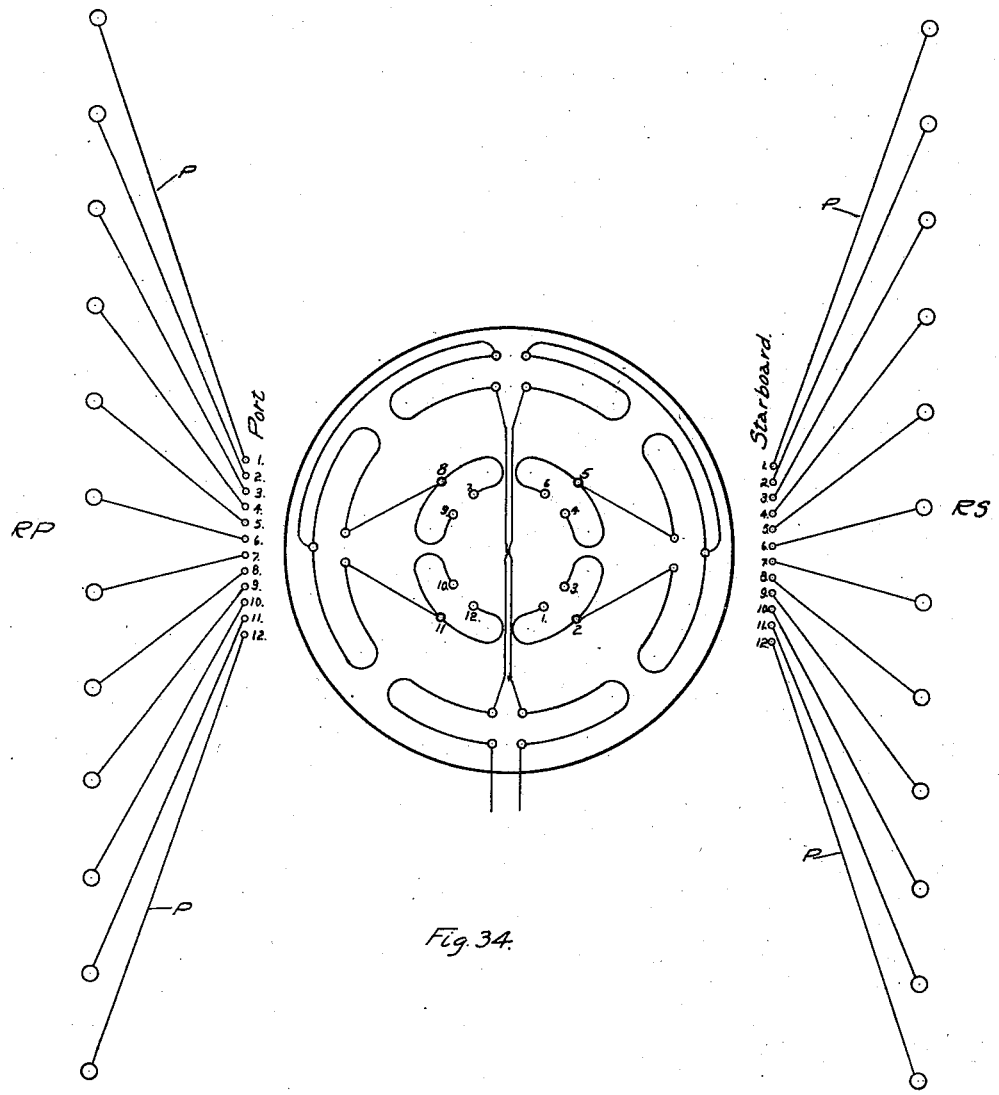

In the drawings Figs. 1, 2, and 3 are diagrams shown for the purpose of explaining the fundamental features of the invention. Fig. 4 is a diagrammatic plan view, partly in section, of a simple form of compensating device for two receivers. Fig. 5 is a detail view showing the modification of the apparatus shown in Fig. 4. Figs. 6, 7, and 8 are a front elevation, a rear elevation, and a side elevation, respectively, of a simple type of apparatus for variably compensating the leads from a plurality of receivers. Figs. 9 and 10 are diagrams illustrating the air paths as employed in one form of rotary plate compensator. Fig. 11 is a bottom plan view of the top plate of a simple form of rotary plate compensator. Fig. 12 is a top plan view of the bottom plate for such compensator. Fig. 13 is a section taken along the line XIII—XIII of Fig. 11. Fig. 14 is a section along the line XIV—XIV of Fig. 12. Fig. 15 is a section along the line XV—XV of Fig. 12. Fig. 15ᴬ is a diagram showing the spacing of the receivers used with the rotating plate compensator of Figs. 11 to 15. Fig. 16 is an elevation, partly in section, of a compensator for two lines of twelve receivers each. Fig. 17 is a bottom plan view of the top compensating plate of the compensator shown in Fig. 16. Fig. 18 is a section along the line XVIII—XVIII of Fig. 17. Figs. 19 and 20 are a top plan view and a side elevation respectively of the bottom compensating plate of the compensator shown in Fig. 16. Fig. 21 is a fragmentary section along the line XXI—XXI of Fig. 19. Fig. 22 is a section along the line XXII—XXII of Fig. 19. Fig. 23 is a section along the line XXIII—XXIII of Fig. 19. Fig. 24 is a fragmentary plan view of the opening 825ₐ of Fig. 19. Figs. 25 and 26 are a top plan view and a side elevation of the top valve plate of the compensator shown in Fig. 16. Figs. 27 and 28 are a top plan view and a side elevation, partly in section, of the bottom valve plate of the compensator shown in Fig. 16. Fig. 29 is a side elevation of receiving apparatus designed to be used with the compensator shown in Fig. 16. Fig. 30 is a vertical section through the receiving apparatus shown in Fig. 29. Figs. 30ᴬ and 30ᴮ are diagrammatical views of modifications of the receiving apparatus shown in Fig. 30. Figs. 31 and 32 are detail views showing the arrangement of the rubber nipple receivers of each group. Fig. 33 is a diagrammatical view showing mounting on a ship's hull of the receiver containing blisters shown in Fig. 29. Fig. 34 is a diagram of the connections of the compensator shown in Fig. 16, and its receiving units. Fig. 35 is a vertical section through receiving apparatus similar to that shown in Fig. 29, but mounted in a tank inside the ship instead of in a blister.

In diagram shown in Fig. 1, the points A and B indicate two sound receivers placed in the water spaced apart horizontally. The lines AL and BR indicate air tubes conveying sound from the receivers A and B to the left and right ears L and R of the observer. Suppose now that the sound wave is approaching in the direction of the arrow X so that the line BO indicates the position of the wave front when the receiver B is being actuated. If the air columns AL and BR are equal in length, the sound will arrive at the right ear before the left ear, the time lag being equal to the distance AO divided by the velocity of sound in water, and the observer will judge that the source of sound lies to his right. Suppose now that the length of the air column BR be increased and the length of the air column AL be decreased until the difference in their lengths is sufficient to offset the time lag between the reception of sounds from B and A. This difference in length must be made equal to the length AO multiplied by the ratio of the velocity of sound in air to the velocity of sound in water, which is .23.

Under these conditions the observer will receive in the two ear pieces simultaneously the sound pulses from A and B, and to him the sound will appear to come from a point located in a median plane through the head or will be "centered binaurally". The binaural sensation by which the observer judges the sound to be at one side or to be centered, depending upon where the sound waves arrive at the ears at different times or at the same time, is found to be accurate and refined. The direction of the sound wave will thus determine the amount of path difference which it is necessary to introduce between AL and BR in order to have a binaural center, or the amount of "compensation" necessary to produce this effect.

This path difference is equal to the length $$AO\frac{V_a}{V_w} = AB\frac{V_a}{V_w} \sin a$$

where $a$ is the angle between the direction of travel of the wave and the perpendicular to AB, and $V_a$ and $V_w$ are the velocities of sound in air and water respectively. Suppose that the difference in the length of the paths AL and BR is to be indicated by some scale. The above formula is the basis of the scale calibration to be used. It is readily seen that the amount of compensation to be introduced in the air columns AL and BR, in order to binaurally center the sounds from A and B, is the same for the direction X as for the direction Y symmetrical to X with respect to the line AB.

If it is desired to determine the direction of the sound from a distant ship by the amount of compensation necessary to center the sound binaurally, it may be done by using an additional pair of receivers having a base line of different direction than the line AB.

In Fig. 2 four receivers A, B, C, and D are shown as mounted at the corners of a square. Suppose the sound is actually coming in the direction of the arrow X. By connecting the receivers A and B to the ears and compensating binaurally, the observer will determine that the sound is coming in either the direction X or the symmetrical direction Y. If the observer then listens with the receivers B and C in the same manner, he will determine that the direction is either X or its symmetrical direction Z with respect to the line BC. The true direction X is therefore uniquely determined as that common to the two observations. In practice it will not be necessary to actually compensate or binaurally center on the two pairs of receivers, B and C. The direction is determined to be either X or Y by use of the pair A and B, and it is sufficient to listen to the sound with the pair of receivers B and C connected by equal tube lengths to the ears. If the sound appears to come from the observer's left (the ear connected to B) then the direction will be determined as X. If it appears to come from the observer's right (the ear connected to C) it will be determined as Y. If instead of having single receivers at A, B, C, and D, each letter represents a group of receivers, the same method of direction determination by compensation may be used.

If a plurality of receivers is used the direction determination may be made by bringing the sounds into phase to produce a maximum sound, and the maximum may be combined with binaural centering, if a plurality of receivers are connected with each ear. Referring to Fig. 3, let A, B, C, D, E, F indicate a line of equally spaced receivers mounted in the water, for example on the side of a ship. Let the lines AM, BM, CM, DM, EM, and FM represent air paths of the same length leading to a common collection point M. If the sound strikes the line of receivers in a direction at right angles to the line, the sound waves over the several lines AM, BM, etc. will all be brought into phase at the point M and the sound will be heard at a maximum. On the other hand if the sound strikes the line of receivers A, B, C, etc. at another angle, the sound waves will not be brought into phase at the point M, provided the paths AM, BM, etc. are all of the same length, so that the intensity of the sound will not be a maximum, but will be reduced, due to the interference of the waves successively arriving over the several paths, AM, BM, etc. at the point M. Suppose, however, that the paths AM, BM, etc. have a variable length. Then if a sound wave strikes the row of receivers from the direction X, the sound waves transmitted over the air columns AM, BM, etc. may be brought into phase by relatively varying the length of the air columns. If the length of the air column BM is shortened with relation to the air column AM by the amount $b\frac{V_a}{V_w}$, where $b$ is the distance between the wave front and the receiver B when the wave front strikes the receiver A, the received waves from the receivers A and B will arrive at the point M at the same time. Similarly, if the air column CM is shortened by the distance $c\frac{V_a}{V_w}$, the waves travelling over it will be brought into phase with the waves over the air columns AM, BM. Similarly the remaining paths DM and FM may be proportionally shortened so that the sound pulses from all of the receivers will be brought into phase at the point M.

It will be seen that a sound coming from the direction Y which is symmetrical to the direction X, will also be brought into phase at the point M with the same compensation as for the sound coming from the direction X. In practice this ambiguity may be removed by mounting the two lines of receivers parallel to the keel of the ship and on the port and starboard side respectively, so that each line will be shielded by the ship's hull from sound coming from the opposite side of the ship. The observer, by listening to the two lines of receivers successively and comparing the intensities, can readily determine from which side of the ship the sound is coming. Or if receivers on the port side are connected to one ear of the observer and receivers on the starboard side are connected to the other ear, the observer can tell from which side of the ship the sound is coming by his binaural sense of direction.

In Fig. 4 is illustrated a simple form of conpensator for use with two receivers. Let reference numerals 21 and 22 indicate two sound receivers, which are illustrated as submarine sound receivers, which may consist of rubber diaphragms closing the ends of the air tubes 23 and 24 respectively. The air tubes 23 and 24 are of equal length. Over the ends of these tubes are slidingly fitted two tubes 25 and 26 which lead to the left and right ear pieces 27 and 28 of a stethoscope. If a sound strikes the receivers 21 and 22 at the same time, as it will if it comes from a direction at right angles to the line joining them, the sound will be binaurally centered in the ears of the observer if the air paths from the two receivers to the respective ear pieces of the stethoscope are of the same length. Suppose, however, that the sound comes from such an angle that the wave front arrives at the receiver 22 in advance of the receiver 21. Then if the air paths to the stethoscope are of the same length, the observer will hear the sound to his right. However, if the tubes 25 and 26 are slid to the left so that the air column from the receiver 22 is lengthened with respect to the air column from the receiver 21 to introduce a time lag equal to the difference in the time of arrival of the wave front at the receiver 21 after the receiver 22, the sound will be binaurally centered by the observer. By means of a suitably computed scale 29 the observer may read directly the angular bearing of the sound with relation to the base line of the receivers by binaurally centering the sound. Instead of using the separate leads to determine by the binaural sensation when the two sounds are in phase at the two ears, the sliding tubes 25 and 26 may be connected to a common tube 30, having branches 31 and 32, to the stetheseope ear pieces, as shown in Fig. 5. In this case when the tubes 25 and 26 are positioned to bring the sound waves into phase in the tube 30, the sound will be heard as a maximum but without a binaural. If the lengths of the air paths from the two receivers 21 and 22, which are tributary to the common air column 30 are such as not to bring the received pulses into phase, the sound heard will be reduced by interference.

In Figs. 6, 7, and 8 is indicated diagrammatically a compensator of the "trombone" type, for use with a larger number of receivers. In these figures, reference numerals 41, 42, 43, etc. indicate a plurality of equally spaced submarine sound receivers. In practice such receivers will be spaced apart farther than the spacing indicated in the diagram, the whole line of receivers, extending over a length of several feet. The receivers are connected by leads of equal length to a plurality of trombone slides $41^a$, $42^a$, etc. The trombone slides are connected through sliding "trombone" tubes $41^b$, $42^b$ etc. all of the same length, to two cones 63 and 64 which are connected with the left and right ear pieces 65 and 66 of a stethoscope. If the sound strikes the line of receivers 41, 42, etc. broadside, it will be binaurally centered by turning the lever 60 to a horizontal position, for in this position the air paths from the several receivers to the setethoscope will all be of the same length. Suppose, however, the sound wave approaches at such an angle that it will arrive at the receiver 52 first. If the lever 60 is horizontal so that all of the air paths to the stethoscope are of equal length, the sound will be heard in the right ear to which the stethoscope lead 66 is applied. The observer will then raise the right hand end of the lever 60 as shown in Fig. 6 and thereby proportionately change the length of the several air columns from the receivers to the stethoscope, until the sound is heard at a maximum and is binaurally centered. Then by reading the angularly calibrated scale 67, the observer can determine the angular direction of the sound. If the receivers 41, 42, 43 etc. are spaced apart equally, then the increments or decrements in the lengths of the several sound conducting paths must be made equal, which as shown in the illustration is done by spacing the trombone slides squal distances along the lever 60.

As shown in Figs. 6, 7 and 8, the line of twelve receivers is divided into two sections of six receivers each, each section being connected to one of the ear pieces of the stethoscope. The compensation will therefore serve to bring the sound pulses from the receivers 41, 42, 43, 44, 45, 46, all into phase at the left ear piece 65, and the pulses from the receivers 47, 48, 49, 50, 51, 52 all into phase at the right ear piece 66 of the stethoscope, so that the sound will be at a maximum in both ears. The compensator also brings the sound pulses from the two sections of the receiver line into phase with each other, so that the sound maxima at the two ears are in phase with each other, and the sound is binaurally centered. A line of compensated receivers in which a plurality of receivers are connected with each ear has the combined advantages of a maximum intensity and a binaural centering. This is of particular advantage where there are a number of different sound sources in the sound field.

When the compensator is set on a particular sound it not only amplifies such sound and makes it stand out from the sound background, but also serves to focus out or diminish the intensity of sounds coming from other directions. This enables an observer to more easily listen to the sound of one ship when there are a number of ships in the neighborhood. The combination of a plurality of receivers connected by compensated leads also gives a louder absolute intensity to the sound, and therefore greater range in listening to a particular sound, irrespective of its advantage in focusing out interfering sounds.

The multi-unit compensator indicated in Figs. 6 to 8 may be used as a pure maximum instrument without the binaural. For a pure maximum instrument the cones 63 and 64 are joined in a common lead which branches to the two ear pieces of the stethoscope in the same way as indicated in Fig. 5. In such a case the pulses from the twelve receivers are brought into phase in a common lead.

While compensators have been built of the sliding tube type, such as are shown in Figs. 4 to 8, it has been found preferable from a mechanical standpoint to use rotary plates having grooves cut in them for the variable air paths. The air paths of one type rotary plate compensator are shown diagrammatically in Figs. 9 and 10, while the structure of the plates is shown in Figs. 11 to 15 respectively. Referring to Figs. 9 and 10, let reference numerals 101 to 112 inclusive indicate twelve receivers, for example submarine sound receivers. Let reference numerals 121 to 132 inclusive indicate air paths such as tubes leading to the compensator 140. The compensator has a circular plate in which are a number of concentric grooves which are interrupted by a block 160, forming two sets of arcuate air paths 141, 142, to 152 inclusive, connecting to the respective leads 121 to 132 inclusive. At the sides of the block 160 are two collecting air paths 161 and 162 leading to left and right stethoscope ear pieces 163 and 164 respectively. The lengths of the air paths from the several receivers 101 to 112 to the stethoscope are predetermined so that when the block 160 is in the position shown in Fig. 9, such air paths all have the same length. With the parts in such position, if a sound wave strikes the row of receivers broadside, the sound pulses traveling over the several air paths will be brought into phase at the stethoscope and the sound will be heard as a maximum and will also be binaurally centered.

The radii of the circular grooves in the compensator plates are so chosen that the ratio of the distance of the receiver 106 from the middle point 100 of the line of receivers to the radius of the groove 146, the ratio of the distance from the receiver 105 to the point 100 of the radius of the groove 145, etc. are all equal. If the block 160 is swung to one side from the position shown in Fig. 9, the air paths in the several grooves will be varied in proportion to the radii of the grooves, and therefore in proportion to the distance of the several receivers from the center point 100. Suppose now that the sound wave strikes the line of receivers coming from the left at an angle indicated by the arrow S, having the wave front indicated by the dotted line T. The sound will arrive at the several receivers 101, 102, etc. successively, and will be heard in the left ear of the observer, to which the stethoscope ear piece 163 is applied. To compensate the air paths and bring the sound in the stethoscope to a maximum and binaurally center it, the block 160 is swung to the right as shown in Fig. 10. Because of the predetermined relation of the radii of the plate grooves to the spacing of the receivers, the air paths from the several receivers, 101, 102, will be lengthened in such proportion that the sound pulses will all reach the ear pieces of the stethoscope in phase. The spacing of the receivers in the water and the length of the air paths in the compensator grooves are known so that an angularly calibrated scale may be applied which will indicate for the angular positions of the block 160, the angular bearing of the source of sound.

The construction of the type of compensator plates indicated diagrammatically in Figs. 9 and 10 is shown in Figs. 11 to 15 inclusive as designed for twenty-eight receivers. The compensator comprises upper and lower plates 201 and 202. The lower plate, 202, is fixed in position. The upper surface of this plate is plain except for a series of fourteen arcuate blocks 211 to 224 inclusive. At the ends of these blocks are holes drilled through the plates, the holes being numbered 231 to 258 inclusive, the holes 231 to 254 being at one side of the blocks and the holes 245 to 258 being at the other side of the blocks. These holes are connected with twenty-eight receivers by means of air pipes 260. These receivers are spaced in a straight line in the water, as indicated in Fig. 15$^A$, the receivers corresponding to the several holes being indicated by reference numerals 231$^A$, 232$^A$, etc. The plate top 201 fits over the plate 202, being supported by an adjustable bearing screw 261 and antifriction ball 262, to be easily rotated. In practice the faces of the plates are lubricated with castor oil which forms an oil film which allows the two plates to smoothly ride over and prevents sound leakage between the air paths on the plates.

The upper plate 201 has fourteen concentric grooves numbered 271 to 284. A sector of the grooves is filled with Babbitt or Wood's metal, indicated at 285, Fig. 11. On each side of this filled sector are two radial grooves 286 and 287, which lead from the end of the outer groove 271 to the center of the plate communicating with the ends of the intermediate grooves and terminating in two openings 288 and 289, to which are connected air tubes 290 which lead to the respective ear pieces of a stethoscope. When the plates are fitted together the blocks 211 to 224 fit in the several grooves 271 to 284 interrupting such grooves. When the plates are fitted together the receivers 231$^A$ to 244$^A$ are connected through the holes 231 to 244 to the sections of the grooves which extend from the blocks 211 to 244 around to the collecting slot 286. Similarly the receivers 245$^A$ to 258$^A$ are connected through their connecting tubes and holes 245 to 256 to the opposite sections of the grooves, which lead from the interrupting blocks 211 to 224 to the collecting slot 287. Thus the two sections of the line of receivers are connected to the two ear pieces of a stethoscope, the receivers at the extreme ends of the lines being connected to two sections of the outside groove, and so on, with the two receivers at the middle of the line connected to the two sections of the inside groove.

When the plates are assembled, having relative positions shown in Figs. 11, 12, 13, and 14, the air paths are such that the sound pulses coming from the several receivers for a wave striking them broadside, are brought into phase at the outlet ends 288 and 289 of the collection slots 286, 287, and therefore into phase at the ears of the observer. The receivers are relatively spaced apart with relation to the spacing of the concentric plate grooves, so that on turning the upper plate the air paths through the grooves are lengthened and shortened proportionately to the spacing of the receivers. It will be noted that as the upper plate is turned, the sections of the grooves leading to one half of the lines are shortened, while the sections of the grooves leading to the other half of the lines are lengthened. Knowing the radii of the plate grooves, the spacing apart of the receivers in the water, and the relative velocity of sound in air and water, the angular turning of the upper plate necessary to compensate for the sound wave striking the line of receivers at any angle can be readily calculated, and a suitably calibrated scale applied to the plate.

The variable compensation by means of the circularly grooved plates is particularly advantageous from a mechanical standpoint. The grooves can be closely spaced on the plates, the plates make a compact mechanical structure and one which can be easily operated.

With the type of compensator plates shown in Figs. 11 to 15, compensation takes place in a single stage, that is, one path of variable length is interposed in each of the leads from the several receivers to bring the sound pulses into phase, and the sound pulses thus brought into phase are conducted to the listening device by a common collection path (the collection slots 286 and 287). The compensation may, however, be made progressive by dividing the line of receivers into several groups, bringing the lead paths of each group to common collection points with variable compensation in each of the paths, so that the pulses from each group of receivers are brought into phase with each other at the common collection point for that group. The pulses at the collection points of the several groups are however, not in general in phase with each other. The collection points of the several groups are divided into groups and those of each group are in turn connected by variably compensated paths to another collection point at which the pulses are brought into phase, and so on, so that at the final collection point the pulses from all of the receivers are brought into phase. This is known as progressive compensation, and is shown in another type of rotary plate compensator illustrated in Figs. 16–26 inclusive. In this compensator is also embodied a valve whereby the compensator can be switched to either one of two lines of receivers placed on the starboard and port sides of the ship respectively.

The arrangement of receivers and compensator connections is shown diagrammatically in Fig. 34. As shown in this figure there are two lines of twelve receivers each, indicated by reference characters RP and RS. The receivers are connected by air paths P to terminals near the compensator indicated by reference numerals 1 to 12, twelve for the port line of receivers and twelve for the starboard line of receivers. In order to avoid confusion of crossing lines the connections of these terminals to the compensator are not shown in the diagram, but the numerals 1 to 12 inclusive indicate the positions on the lower compensator plate to which the connections from the terminals lead, either the port or starboard line being connected to this plate by valves.

Referring to the structure of the compensator as illustrated in Figs. 16 to 26: The compensator has a pedestal 401 surrounded by a sheet metal casing 402. Inside of the sheet metal casing are twenty-four air tubes 403, which extend to the receivers, twelve to the starboard side and twelve to the port side. Mounted on the pedestal 401 is a stationary bottom valve plate 410 shown in detail in Figs. 27 and 28. Through this valve plate are twenty-four holes to which are connected the air pipes 403. These holes are indicated respectively by means of reference numerals 501 to 512 inclusive and 601 to 612 inclusive. The holes 501 to 512 are connected to one line of receivers on one side of the ship, while the holes 601 to 612 are connected to the line of receivers on the other side of the ship. The hole 501 is connected to the number 1 port receiver, the hole 502 to number 2 port receiver and so on. Similarly the hole 601 is connected with number 1 starboard receiver, the hole 602 to number 2 starboard receiver, and so on, the receivers being numbered as shown in the diagram, Fig. 34.

Fitting on the top of the plate 41 is a top valve plate 700, shown in Figs. 25 and 26, which has a limited rotation with respect thereto. Through the upper plate 700 are twelve holes indicated by reference numerals 701 to 712 inclusive. When the plate is turned in a clockwise direction these holes are brought over the holes 501 to 512 in the plate 410 making connections with the port line of receivers. By turning the plate in the other direction the holes 701 to 712 are connected with respective holes 601 to 612 in the plate 410, thus connecting the compensator to the starboard line of receivers. Formed in the top of the plate 700 are a number of grooves indicated by reference numerals 721, 722, 723, 724, 725, 726, 727, and 728. The groove 727 is continuous along the top of the plate, while the groove 728 has a cross-under indicated by the dotted lines 729, which takes it under the groove 727 at the middle of the plate, so that the grooves are reversed in position at the left hand side of the plate as viewed in Fig. 25.

At the edge of the plate are two holes 730 and 731 which extend downwardly and outwardly through the plate and terminate in the nipples 732 and 733 (shown in Fig. 16) to which are attached the leads to the respective ear pieces of a listening stethoscope. A helical spring shown by dotted lines 740 in Fig. 16, fits around the downwardly extending post 741 of the plate 700, supporting part of its weight and permitting the plate 700 to turn more easily over the plate 411. The bearing surfaces of the valve plates are lubricated with castor oil which forms a thin tight film between them.

Fitting on top of the plate 700 is a plate 800. The two plates are fitted with an airtight shellac seal between them, and are held fixed in position by clamping screws through the holes 850, 851, and 750, 751 in the plates 800 and 700 respectively.

Formed on top of the plate 800 are a number of blocks indicated by reference numerals 831 to 840 respectively. At each end of the inner blocks 831, 832, 833 and 834 are openings through the plate. These openings, indicated by reference numerals 801, 803, 804, 806, 807, 809, 810, and 812, communicate with the openings 701, 703, 704, 706, 707, 709, 710, and 712 respectively through valve plate 700. Near the blocks 831, 832, 833, and 834 are holes numbered 802, 805, 808, 811, which are located directly over the holes 702, 705, 708, and 711 in the valve plate 700. At the ends of the blocks 835 and 837 are holes 821, 822, 823, and 824 which communicate with the outer ends of the slots 721, 722, 723, 724 respectively in the top of the plate 700. The two sets of holes 827 and 827$^A$, and 828 and 828$^A$ located at the ends of the blocks 836 and 838 communicate with the ends of the two slots 727 and 728 in the top of the plate 700. At the ends of the block 839 are holes 825 and 826 which communicate with the right ends of the slots 725 and 726 of the plate 700 as viewed in Fig. 25. Located near the blocks 835 and 837 are holes numbered 825$_A$ and 826$_A$ respectively which communicate with the other ends of the slots 725 and 726 of the plate 700. At the ends of the block 840 are holes 830 and 829 which communicate with the holes 730 and 731 respectively of the plate 700. The shape of the openings at the ends of the blocks is shown in the fragmentary view of Fig. 21, and the shape of the openings through the plane surface of the plate is shown in Figs. 22 to 24 inclusive.

Fitting on top of the plate 800 and rotatably supported thereon is plate 900 shown in Figs. 17 and 18 which together with the plate 800 forms the variably compensated air paths. The plate 900 is supported by the screw 950 (Fig. 16) which engages the pivot bearing hole 860 on the plate 800. The screw 950 is adjusted to afford a very slight clearance between the two plates, the two plates being lubricated with castor oil which forms an airtight film between the air paths in their faces. In the bottom face of the plate 900 are four inner sets of arcuate grooves of two grooves each numbered 901 and 902. The ends of the two grooves 901 and 902 of each set are connected by end grooves 903 and 904. Outside of these grooves and in staggered relation thereto, are four outer sets of two grooves each, numbered 905 and 906. The inner and outer grooves 905 and 906 of each set are connected at their ends by short connecting grooves 907 and 908. When the plate 900 is applied to the top of the plate 800 the blocks 831, 832, 833, and 834 fit in the four grooves number 901. The holes 802, 805, 808, and 811 open into the corresponding grooves 902. The blocks 835, 836, 837, and 838 fit into the grooves 905. The blocks 839 and 840 fit into two of the grooves 906, and the openings 825$_A$ and 826$_A$ open into the other two of the grooves 906.

The diagram of the air paths in the grooves between the plates 800 and 900 is shown in Fig. 34. The air pipes from the receivers numbered 1 and 3 lead to the holes 801 and 803, at the sides of the block 831. The paths in opposite directions from the block along the groove 901 which is over the block through the short and connecting grooves 903 and 904, join in the groove 902, and pass down through the hole 802 to the inner end of the slot 721. Here they meet the air path from the receiver numbered 2 coming through the hole 702. The leads from the receivers 1 and 3 to the openings 701 and 703 are both of the same length, so that if the sound wave front strikes the line of receivers broadside, the sound pulses are in phase at these two points. And if the plate 900 is turned so that the block 831 occupies the middle of the groove 901, the sound pulses from the two receivers 1 and 3 will be brought into phase at the opening 802, which opens into the end of the slot 721. The length of the connecting pipe from the receiver is longer than the length of the connecting pipes from the receivers 1 and 3 by an amount equal to the distance from one of the holes 701 through half of the groove 901 around through half of the groove 902 and through the hole 802. This extra length is put in so that the sound pulses from the receiver 2 will be brought into phase at the inner end of the groove 721 with the pulses of the receivers 1 and 3.

Suppose, however, that the sound wave strikes receiver number 1 first. Then additional time lag must be imposed on the connection from this receiver to bring the pulses all into phase at the inner end of the grooves 721. This is done by turning the plate 900 to lengthen the air path from the hole 801 to the hole 802, and shorten the air path from the hole 803 to the hole 802 by a corresponding amount. In exactly the same manner the sound pulses from the groups of receivers 4, 5 and 6; 7, 8, and 9; 10, 11, and 12, are all brought into phase at the inner ends of the slots 722, 723, and 724 respectively. The four sound pulses which exist at the ends of the slots 721, 722, 723, and 724 will not be in phase with each other, except for a sound wave striking the row of receivers broadside. To bring these four sound pulses into phase with each other, a second stage of compensation is required. This stage of compensation is arranged to bring the pulses in the grooves 721 and 722 into phase with each other, and the pulses in the grooves 724 and 723 into phase with each other, respectively. The sound pulses from the grooves 721 and 722 travel up the holes 821 and 822 at the ends of the block 835, and pass from the block 835 in opposite direction along one of the grooves 905, around through the end grooves 907 and 908, and the groove 906 to the hole 825a and down into the end of the groove 725. By turning the plate 900 the grooves 905 and 906 move over the block 835 and the hole 825a, thereby varying the comparative length of the two sound conducting paths so as to bring the sound pulses into phase at the hole 825a. Similarly the sound pulses from the grooves 723 and 724 are brought into phase at the hole 826^A which communicates with the groove 726. The two grooves 725 and 726 are of the same length and are both gradually tapered as shown in Fig. 25. This is for the purpose of reducing the cross sectional area of the air path so gradually as to avoid any substantial reflection and loss of sound.

The radii of the several grooves are so chosen that when the plate is turned to bring the sound pulses from one group of three receivers, say receivers 1, 2, and 3, into phase with each other, they also bring the two pulses which result from the combination of two groups, such as 1, 2, and 3; 4, 5, and 6 into phase with each other. This progressive bringing into phase of the pulses from the several receivers is known as progressive compensation, there being two stages of progressive compensation which bring into phase the sound pulses from the six separate receivers in each half of the line.

The sound pulses arriving at the holes 825_A and 826_a will, however, in general not be in phase with each other. The sound pulses from these two points are led separately to the two ears and are brought into phase by binaural compensation.

The sound pulses from the groove 725 pass up through the hole 825 into a groove 906, around the end to the groove 905 and down the hole 828 into the groove 728. The sound pulse travels across the plate in the groove 728, then up through the hole 828^A around through a groove 905 and groove 906 to the hole 830, which leads to one of the stethoscope ear pieces. The sound pulses from the slot 726 have a similar path through the holes 826, slots 906 and 905, hole 827, slot 727, hole 827^A slots 905 and 906, to the hole 731 leading to the other stethoscope ear piece. By rotating the plate 900 the sound pulses to one ear may be suitably lagged behind the pulses to the other ear. It will be noted that for the binaural compensation the sound pulses to each ear travel through two sets of slots 905 and 906, so that turning the plate gives double the difference in air path which turning the plate gives to the air path for the second stage compensation between the sounds coming from the slots 721 and 722. The reason for this is that the second stage compensation must bring into phase the sound pulses. In the grooves 721 and 722 which have a phase difference proportional to the distance between two receivers 2 and 5 (the middle receivers of the two groups of receivers 1, 2, and 3; 4, 5 and 6) which the binaural compensation must bring into phase pulses in the two grooves 725, 726, which have a phase difference proportional to the distance between the center point of the group of six forward receivers and the center point of the group of six rear receivers, which is double the distance between the receivers 2 and 5.

The two stage compensation brings the sound pulses from the six forward receivers all into phase at one ear and the sound pulses from the six rear receivers all into phase at the other ear, thereby producing a maximum sound in each ear. The binaural compensation brings these two maxima into phase with each other and enables the operator to determine the direction of a sound source both by the maxima and by the binaural.

The valve plate 700 is turned to the right or left to connect the compensator to either the starboard or port side by means of handles 770 and 771, one of which is provided with a latch 772 for locking the plate 700 in position. The operator determines the direction by which the sound is coming by shifting the valve plates and listening to see which side of the ship the sound is the loudest.

The top compensator plate 900 is turned by means of a hand wheel 920. A suitably calibrated scale is mounted on bevelled edge 921 of this plate and is read through a window 922 through a metal screen 923, which extends around the scale and is supported by the stationary uprights 924. This scale has preferably two lines of angular division on it, one for the starboard side and one for the port side. A screen supported by the uprights 925 carried from the plate 700 is arranged to mask one set of figures when the valve is set for the starboard and mask the other set of figures when the valve is set for the port side.

Instead of the single receiving units connected with the air leads as shown in the diagram of Fig. 34, a group of eight individual receivers is connected to each one of the twelve air pipes going through one side of the ship. These twelve groups of receivers are indicated by reference numerals 1001 to 1012 inclusive in Fig. 29. Each group of receivers is connected to one of a series of twelve air pipes 1101 to 1112 respectively. These air pipes extend through the stuffing-box, through the skin of the ship, and their terminals are numbered 1 to 12 respectively in Fig. 34, from which terminal connections are made to the compensator. The lengths of the several air pipes and their connections to the compensator are all the same, except that the air pipes 1102, 1105, 1108, and 1111, each have a few inches of extra length so that the air columns are all of the same length from the receivers to the inner end of the slots 721, 722, 723, and 724, where the groups of air columns join, as has been explained more fully heretofore. As shown in Fig. 29 the air pipes 1101 to 1112 are bent in such a manner that they all have equal lengths outside of the ship's hull. This is done for the purpose of having the same temperature conditions over equal length of the several air columns, because in general the temperature will be lower outside of the ship's hull, therefore, the sound velocity will be somewhat greater in these lengths of the air pipes. Receivers for submarine sounds may also be mounted in the water or oil tanks of a ship, with the lengths of the air tubes in the liquid all the same, as the temperature of the liquid will in general be different from the air space of the ship.

Each group of receivers comprises eight individual receivers as shown in the detail views Figs. 31 and 32. Each receiver consists of a soft india rubber nipple 1015, clamped over the end of one of the small tubes 1014$^a$ and 1014$^b$. These tubes are connected by branching tubes 1016, 1017$^a$ and 1017$^b$ to the respective main air conducting tubes 1101, 1102, etc. As the lengths of the branching tubes are fixed, the receivers of each group will of necessity be relatively compensated among themselves for some particular direction. As shown in Figs. 29, 31, and 32 they are given a fixed forward compensation, the right hand end of the line viewed in Fig. 29 being toward the bow of the ship. The small forwardly projecting tubes 1014$^a$ are longer than the small rearwardly projecting tubes 1014$^b$. These lengths are chosen so that the sound waves coming from the bow will be brought into phase at the junction points 1016. Similarly the two pipes 1017$^a$ and 1017$^b$ are of unequal length to bring the collected sound pulses into phase at the junction point 1018. The fixed forward compensation of the branching connections of the main collecting tubes is chosen, because in following submarines the sounds are most frequently heard from the bow of the ship. The amount of phase difference between the different receivers of the same group is, however, so small even for sounds striking the line of receivers broadside that it does not seriously interfere with broadside reception.

The mechanical mounting of the lines of the receivers on the ship's hull is shown in the cross section of Fig. 30. A number of brackets 1020 are bolted to the skin of the ship. On the outside of these brackets are inertia plates 1021. The inertia plates consist of heavy metal plates of lead or iron about an inch thick. Behind the inertia plates are mounted sound screens 1022. The sound screens are made of thin flat sheet metal boxes filled with some compressible material, such as felt. The screens shield the receivers from noises coming from the ship's hull, and the inertia plates permit the receivers to be placed closer to the pressure release surface of the sound screens and to the pressure release surface formed by the side of a thin walled ship. The receivers are mounted in front of the inertia plates as shown in Figs. 29 and 30.

Instead of placing an inertia plate outside of the ship's skin as shown in Fig. 30 an inertia plate or stiffening backing may be applied directly to the ship's skin. In Figs. 30$^A$ and 30$^B$ are illustrated modifications in which the inertia loading or stiffening I is applied inside of the ship's skin. In Fig. 30$^A$ the receiver R is mounted outside of the ship, while in Fig. 30$^B$ the receiver R is shown as mounted in an inset through the ship's skin. The function of this backing is not only to deaden the disturbing noises originating in the ship, but to increase the intensity of the noises received from the distant sound source by preventing the pressure release of the sound wave at the skin of the ship in the neighborhood of the receiver. This backing may be in the form of a heavy metal plate, a layer of concrete or similar material against the skin of the ship, or stiffening members or ribs applied to the skin of the ship.

The assembly of the receivers, inertia plates, and sound screens is covered with a stream line protecting sheet metal blister 1023. The blister does not make water tight joint with the ship's skin so that the water fills the inside of the blister, and surrounds the receivers, and inertia plate sound screens. It is found that the sound waves travel readily from the outside water through the metal wall of the blister into the water enclosed in the blister.

The blisters are usually mounted on the two sides of the ship near the keel, as indicated diagrammatically at 1024 and 1025 in Fig. 33 in which 1026 indicates the outline of the ship's hull. The ship's hull forms sound screen so that the line of receivers on the side away from the sound is in a sound shadow which enables the operator to readily determine from what side of the ship the sound is coming by observing the relative intensity of the sound.

While the compensator shown in Figs. 16 to 33 has been described as operating binaurally, it is obvious that it may be used as a maximum instrument, in which case the two stethoscope connection nipples 732 and 733 would be joined to the common connection which in turn would lead to the stethoscope through a Y connection similar to the stethoscope connection shown in Fig. 5.

In general it is found that the maximum or focus is sharper when there are a considerable number of receivers connected through the compensated lines to the ear.

The maximum is of great aid in assisting the binaural sense in determining the direction of the sound. The maximum makes the sound which is binaurally set on, stand out sharper at the point of binaural centering. It also focusses out sounds coming from other angular bearings. This gives the line of receivers containing several units, the power of discrimination in focusing on desired sound and minimizing undesirable sounds. This is found to be of particular advantage when there are a number of ships in the sound field, and it is desired to follow the sound of a particular ship to the exclusion of others. It also minimizes the wave noise which in general is coming from all directions, and lessens to a marked degree the disturbing noise in a ship under way caused by the engines of that ship.

Instead of mounting the receivers externally of the ship's hull, they may be located in the dead water space between the outer and inner hulls, or may be located in water or oil tanks of the ship. Fig. 35 shows a sectional view of receivers mounted in a tank inside the ship. In this case the brackets 1020 may be bolted to the tank 1023ª as shown. The sound vibrations travel through the sides of the ship from the water outside to the liquid inside.

The present invention has been particularly described with reference to variably compensated wave conducting connections. It is obvious, however, that these connections might be fixed in length, in which case the compensated line of receivers would respond to sound approaching from a particular direction only. For example, instead of varying the lengths of the trombone slides as shown in Figs. 6 to 8, the air paths might all be given a pre-determined fixed length, and the direction of sound determined as bodily turning the line of receivers. If the air paths all have the same length, then the receivers will give a maximum sound and will binaurally center such a sound only in case the sound came at right angles to the base line of the receivers. Similarly, the lengths of the air paths might be differently proportioned so that the lines of receivers would respond to sound coming from some particular angle other than a right angle. The present invention in its broader aspect is not limited to variable compensation and may be embodied in structures having a plurality of receivers with connections of fixed lengths so proportioned as to give a maximum for sounds for some particular direction. It is of advantage, however, to employ variable compensation, particularly when a line of receivers is relatively fixed in direction, such for example as being mounted on the side of the ship.

While the present invention has been specifically illustrated and described in connection with apparatus for determining the direction of submarine sounds, it is to be understood that the invention is not limited to such application, but may be embodied in other structures within a scope of the following claims:

I claim:

1. In apparatus of the character described, the combination of two or more receivers of wave energy, and means for transmitting and utilizing the energy from the receivers, comprising energy transmitting paths compensated to impose on the energy transmitted from one receiver, a time lag, with relation to the energy transmitted from another receiver at which the wave energy has a later arrival, equal to the difference in time of the arrival of the wave energy at the receivers, substantially as described.

2. In apparatus of the character described, the combination of two or more receivers of wave energy, and means for transmitting and utilizing the energy from the receivers, comprising the energy transmitting paths and means for varying at will the relative time of travel of the energy over the paths to compensate for an earlier arrival of the wave energy at one receiver and bring the transmitted wave energy into phase at the place of utilization for different angles of incidence of the wave energy on the group of receivers, substantially as described.

3. In apparatus of the character described, the combination of two or more receivers of wave energy, and means for transmitting and utilizing the received wave energy, comprising branch energy transmitting paths from the several receivers and means for varying the time of travel of the energy over the several branch paths in accordance with the time of arrival of the wave energy at the several receivers, substantially as described.

4. In apparatus of the character described, the combination of a number of receivers of wave energy divided into two groups comprising a plurality of receivers each, a binaural listening device having two ear pieces, and energy transmitting paths from each ear piece to one of the groups of receivers so compensated as to bring the wave energy from the several receivers of the group into phase, substantially as described.

5. In apparatus of the character described, the combination of a number of receivers of wave energy divided into two groups comprising a plurality of receivers each, the binaural listening device having two ear pieces, and energy transmitting paths from each ear piece to one of the groups of receivers, so compensated as to bring the wave energy from the several receivers of the group into phase and also bring the wave energy of the two groups into phase, whereby the maximum response is combined with binaural centering, substantially as described.

6. In apparatus of the character described, the combination of at least two receivers of wave energy, a binaural listening device comprising two ear pieces, and an energy transmitting connection from each ear piece to a receiver, and means for imposing a relatively different time lag on the energy transmitted over the two connections, substantially as described.

7. In apparatus of the character described, the combination of at least two receivers of wave energy, a binaural listening device having two ear pieces, and energy transmitting connections from each ear piece to a receiver comprising means for varying at will the relative times of travel for the energy over such connections, substantially as described.

8. In apparatus of the character described, the combination of two relatively movable members, having a sound conducting groove and the other having a block longitudinally slidable in the groove and having a sound conducting opening communicating with the groove at the end of the block, substantially as described.

9. In apparatus of the character described, the combination of two relatively movable members, one having a sound conducting groove and the other having a block longitudinally slidable in the groove, the members having at least three sound conducting openings into the groove, two of which are located at the two ends of the block and movable therewith, and another opening into the groove at a distance from the block, substantially as described.

10. In apparatus of the character described, the combination of two relatively rotating plates, one having an arcuate sound conducting groove and the other having a block fitting into the groove and longitudinally slidable therein so as to vary the sound conducting length of the groove at each side of the block, substantially as described.

11. In apparatus of the character described, the combination of two relatively rotating plates, one having a plurality of arcuate concentric sound conducting grooves in its face, and the other having on its opposing face a plurality of blocks fitting in the grooves and longitudinally slidable therein as the plates are rotated, having sound conducting openings at the ends of the blocks, substantially as described.

12. In apparatus of the character described, the combination of two relatively movable members, one having a sound conducting groove and the other a sound conducting opening longitudinally movable along the groove and the members having a second sound conducting opening for the groove, the movement of the first opening along the groove serving to vary the acoustic length between the two openings, substantially as described.

13. In apparatus of the character described, the combination of two relatively rotatable plates, one having an arcuate sound conducting groove in its face and the other having a sound conducting opening movable longitudinally along the groove as the plates are relatively rotated so as to vary the acoustic length of the path leading to the opening, substantially as described.

14. In apparatus of the character described, the combination of at least three relatively rotatable plates, two of the plates having sound conducting grooves and means for varying the acoustic length of the grooves, and two of the plates having valve openings communicating with the grooves and with external sound passages. The valve openings being arranged to register, part when the plates are in one position and part when the plates are turned to another position, substantially as described.

15. In apparatus of the character described, the combination of at least three relatively rotatable plates, two of the plates having concentric arcuate sound conducting grooves and openings movable longitudinally along the grooves as the plates are rotated so as the acoustic length of the grooves, and two of the plates having valve openings therein, communicating with the openings into the grooves, substantially as described.

16. In apparatus of the character described, the combination of at least three relatively rotatable plates, two of the plates having sound conducting grooves and means for varying the acoustic length of the grooves as the plates are turned, and two of the plates having valve openings communicating with external sound passages, said assembly of plates having sound conducting passages connecting the valve openings and the grooves and connecting certain of the grooves with each other, substantially as described.

17. In apparatus of the character described, the combination with a ship's hull, of a plurality of acoustic submarine sound receivers located outside of the ship's hull and a plurality of air tubes all of substantially the same length extending from the receivers through the skin of the ship, substantially as described.

18. In apparatus of the character described, the combination of a plurality of receivers immersed in a liquid and a plurality of air tubes having equal lengths immersed in the liquid leading from the receivers, substantially as described.

19. In apparatus of the character described, the combination of a plurality of acoustic submarine sound receivers located in a liquid, a compensator outside of the liquid, and air tubes leading from the receivers to the compensator having the lengths of the tubes in the liquid substantially equal and having the lengths of the tubes beyond the liquid also substantially equal, whereby all the tubes are affected substantially the same by a temperature difference between the liquid and the space outside the liquid, substantially as described.

20. In apparatus of the character described, the combination with a ship's hull, of a plurality of submarine sound receivers mounted thereon, and a stream line blister secured to the ship's hull and covering the receivers, substantially as described.

21. In apparatus of the character described, the combination with a ship's hull, of a plurality of submarine sound receivers mounted thereon and an inertia backing for the receivers, substantially as described.

22. In apparatus of the character described, the combination with a ship's hull of a submarine sound receiver mounted thereon and an inertia mass interposed between the receiver and the inside of the ship, substantially as described.

23. In apparatus of the character described, the combination with a ship's hull, of a line of sound receivers mounted thereon, a listening device on board of the ship, and compensated connections between the receivers and the listening device for bringing the sound pulses from the several receivers into phase at the listening device for sounds having different angles of incidence, substantially as described.

24. In apparatus of the character described, the combination with a ship's hull of a plurality of submarine sound receivers so located as to be actuated by sounds coming through the water to the ship, a listening device, and compensated connections from the receivers to the listening device for determining the angular bearing of a source of sound, substantially as described.

25. In apparatus of the character described, the combination with a ship's hull, of a submarine sound receiver carried thereon, and a sound screen located in the water between the receiver and the ship's skin, substantially as described.

26. In apparatus of the character described the combination with a ship's hull, of a submarine sound receiver carried thereon, an inertia plate behind the receiver, and a sound screen between the inertia plate and the ship's skin, substantially as described.

27. In apparatus of the character described, the combination with a ship's hull, of a submarine sound receiver carried thereon, and inertia loading applied to the ship in the neighborhood of the receiver, substantially as described.

28. In apparatus of the character described, the combination with a ship's hull, of a submarine sound receiver carried thereon, and means for counteracting the pressure release at the ship's skin in the neighborhood of the receiver, substantially as described.

29. An acoustical device comprising a plate or disk, channels formed on said plate or disk, means to close the open sides thereof, and means sliding in such channels to vary the effective lengths thereof.

30. A compensator adapted for use with receivers of wave energy, comprising two auditory translating devices, one for each ear, and means for transmitting the wave energy from each receiver to the corresponding translating devices including separate variable energy conducting paths connected with the said translating devices for bringing the oscillations therein into phase, substantially as described.

31. A compensator adapted for use with receivers of wave energy, comprising two auditory translating devices, one for each ear, and means for transmitting the wave energy from each receiver to the corresponding translating devices including separate manually adjustable energy conducting paths connected with the said translating devices for bringing the oscillations therein into phase, substantially as described.

32. An acoustical device comprising a member having channels, means located and adapted to slide in said channels and change the effective lengths thereof, and movable means adapted to support and move said slidable means.

33. An acoustical device comprising two relatively rotatable members, channels formed in one of said members, and means carried by the other of said members and sliding in said channels to vary the effective lengths thereof.

34. An acoustical device comprising two relatively rotatable members, channels formed in one of said members, means carried by the other of said members and sliding in said channels to vary the effective lengths thereof, inlet passages adapted to connect said channels with receivers of wave energy, and outlet passages also connected to said channels, said sliding means being located in said channels between said inlet and said outlet passages.

35. An acoustical device comprising two relatively rotatable disks, channels formed on one of said disks and means carried by the other of said disks and sliding in said channels to vary the effective lengths thereof, and inlet passages and outlet passages for each channel, one of said passages being located in proximity to said sliding means whereby the length of channel between its inlet passage and its outlet passage will be varied by said channel-varying means.

36. A compensator adapted for use with receivers of wave energy comprising two auditory devices, one for each ear, and means for transmitting the wave energy from each receiver to the corresponding auditory device, including separate fluid paths of variable length connected with the said auditory devices for bringing the oscillations therein into phase, substantially as described.

37. A compensator adapted for use with receivers of wave energy, comprising two auditory devices, one for each ear, and means for transmitting the wave energy from each receiver to the corresponding auditory device, including separate manually adjustable fluid conducting paths connected with the said auditory devices for bringing the oscillations therein into phase, substantially as described.

38. The combination with a compensator for adjusting the relative lengths of two independent air columns, of means for transmitting sound from one point to one of said air columns, and from another point to the other air column.

39. The combination with a compensator for adjusting the relative length of two independent air columns, of fluid paths for transmitting sound from one point to one of said air columns, and from another point to the other air column.

40. In apparatus of the character described, the combination of two relatively movable members, one having a sound conducting groove and the other a sound conducting opening, said groove forming an acoustic path to said opening and said opening being longitudinally movable along the groove as the members are relatively moved so as to vary the acoustic length of the path leading to the opening, substantially as described.

MAX MASON.